(12) United States Patent
Bellingroth

(10) Patent No.: US 6,201,481 B1
(45) Date of Patent: Mar. 13, 2001

(54) SAFETY DEVICE FOR FURNITURE

(75) Inventor: Klaus Bellingroth, Gummersbach (DE)

(73) Assignee: OKIN Gesellschaft fur Antriebstechnik mbH & Co. KG, Gummersbach (DE)

( * ) Notice: Subject to any disclaimer, the term of this patent is extended or adjusted under 35 U.S.C. 154(b) by 0 days.

(21) Appl. No.: 09/281,467

(22) Filed: Mar. 30, 1999

(30) Foreign Application Priority Data

Mar. 31, 1998 (DE) .............................................. 198 14 269

(51) Int. Cl.$^7$ .................................................. G08B 21/00
(52) U.S. Cl. .............................. 340/680; 340/686.1; 5/6; 5/616; 5/927
(58) Field of Search .................................. 340/680, 686.1, 340/687, 686.3; 5/6, 8, 11, 53.3, 613–619, 660, 927, 940; 297/71, 158.4, 68

(56) References Cited

U.S. PATENT DOCUMENTS

| 4,407,030 | * | 10/1983 | Elliott | 5/66 |
| 4,586,206 | * | 5/1986 | Singer | 5/18 R |
| 5,061,010 | * | 10/1991 | LaPointe | 297/325 |
| 5,984,404 | * | 11/1999 | Novoa et al. | 296/190.02 |

FOREIGN PATENT DOCUMENTS

| 93 08 344 U | 6/1993 | (DE) | H01B/1/20 |
| 43 05 939 A1 | 8/1994 | (DE) | A47C/20/08 |
| 43 29 535 A1 | 2/1995 | (DE) | H01H/13/16 |

* cited by examiner

*Primary Examiner*—Daniel J. Wu
*Assistant Examiner*—Toan Pham
(74) *Attorney, Agent, or Firm*—Fildes & Outland, P.C.

(57) ABSTRACT

The invention relates to a safety device for furniture with at least one movable element which can be moved by a motor-driven positioning drive controlled by operating controls, particularly the head and/or foot of a base for a bed, or a seat and/or backrest element of an armchair, where the positioning of the element forms a gap in which an object or body part can become trapped as a result of the movement of the element. If a body part becomes trapped, this can lead to serious injury. Objects must also be prevented from becoming trapped, as they can cause damage to the furniture. According to the invention, at least one contact element is positioned in the gap which, when subjected to the pressure applied by an object or body part becoming trapped, closes an electric circuit which bridges a switch associated with one of the operating controls, the closing of which prevents further movement of the positioning drive.

16 Claims, 2 Drawing Sheets

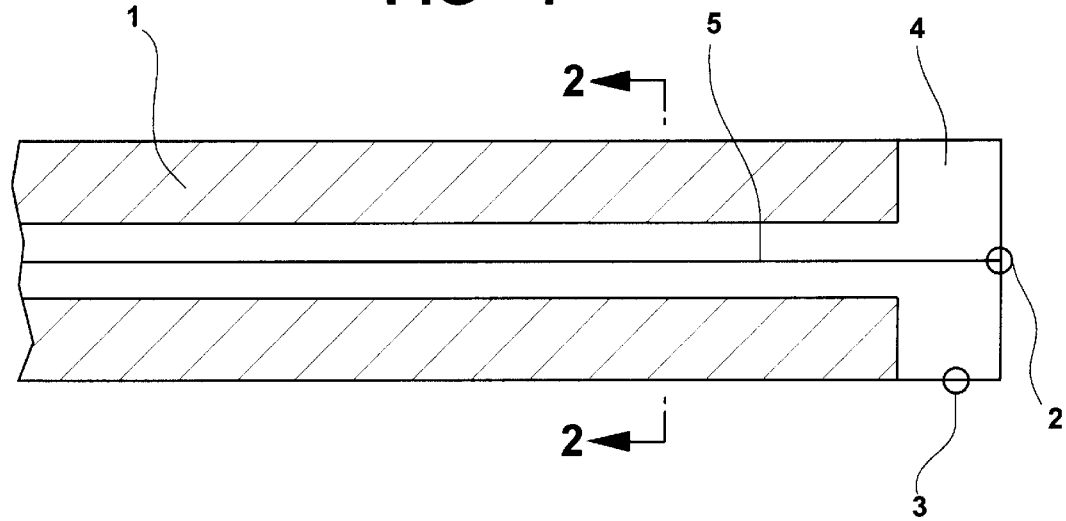
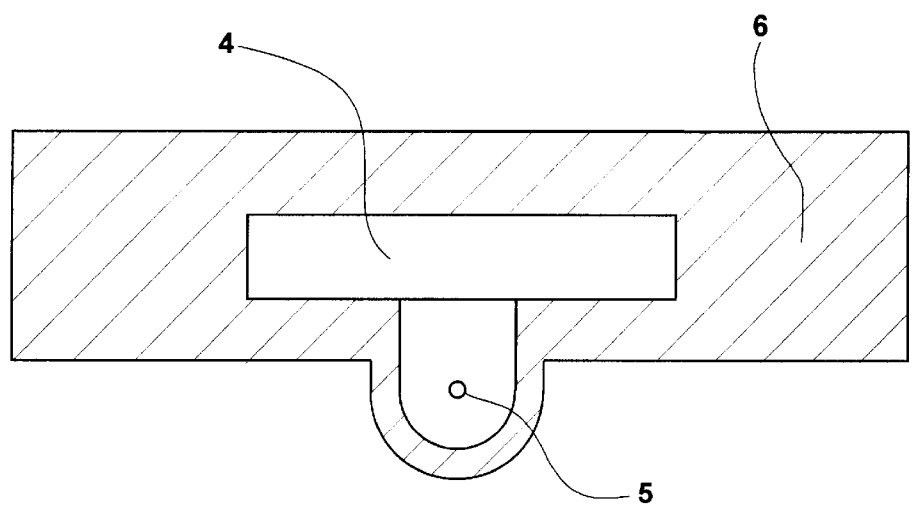

SAFETY DEVICE FOR FURNITURE

FIELD OF THE INVENTION

The invention relates to a safety device for furniture with at least one movable element which can be moved by a motor-driven positioning drive controlled by operating controls, particularly the head and/or foot of a base for a bed or recliner, or a seat and/or backrest element of an armchair, where the positioning of the element forms a gap in which an object or body part can become trapped as a result of the movement of the element.

BACKGROUND OF THE INVENTION

Furniture with at least one movable element is sufficiently known. The use of motor-driven positioning drives makes it possible to employ movable and adjustable elements in furniture. Adjusting an element of a piece of furniture is intended to enable the user to make comfortable and easy use of the furniture. Adjusting the element forms a gap in which an object or body part can become trapped as a result of the movement of the element. For example, a gap of this kind can form between the element and the piece of furniture. The movement of the element can also cause the formation of several gaps, for instance when the element is adjusted by a gearbox with rods. The gap can also be freely accessible or covered by fabric or other similar material.

One disadvantage of furniture of this kind is the danger of an object or body part becoming trapped in the gap as the result of movement of the element. This is very painful for the user and can lead to serious injury. If an object becomes trapped in the gap, this can cause damage to the object itself or to the furniture.

SUMMARY OF THE INVENTION

The invention is based on the object of providing a safety device which can be manufactured inexpensively with simple means and retrofitted without great effort and which effectively prevents the trapping of an object or body part.

According to the invention, the object is achieved by a safety device for furniture having at least one contact element in the gap which, when subjected to the pressure of an object or body part, closes an electric circuit which bridges a switch associated with an operating control, the closing of which prevents further movement of the positioning drive. In this context, the contact element is positioned in the gap in such a way that pressure is exerted on it when there is danger of something becoming trapped. The application of pressure causes the contact element to close the electric circuit. This electric circuit is connected in parallel to the switch of the operating control. Closing the electric circuit of the contact element makes it possible for the current to flow through the parallel electric circuit as if the switch of the operating control were activated, even if the switch of the operating control is open. If the switch of the operating control is closed or bridged, the further movement of the positioning drive is prevented. In this context, "further movement" means movement of the element which could cause something to become trapped even more. Closing the electric circuit bridges the switch of the operating control, the effect on the positioning drive being as if the operating control were activated, regardless of whether it has been activated by the user or not. The advantage of this is that no additional devices or switches are required in order to prevent the further movement of the positioning drive by closing an electric circuit. Consequently, the safety device according to the invention can also be simply retrofitted in conventional furniture with moving elements.

In a preferred example of the invention, the switch is a button on a hand-held control unit. In this context, a hand-held control unit is connected via wires to the furniture and its positioning drives, and is usually equipped with several different buttons. When using buttons, pressure applied to the button closes an associated electric circuit, thus setting the positioning drive in motion. A button of this kind usually works by connecting two electric contacts. Pressing the button activates a control element, such as a relay, which controls the drive in the positioning drive. When using a button of this kind, it is particularly easy to bridge the button, as the contact element need merely be connected in parallel to the button.

In a preferred example of the invention, a contact strip is provided as the contact element. The use of an elongated contact element in the form of a strip has the advantage that positioning the contact element at the edge of the gap can effectively prevent something from becoming trapped in the gap. For example, the contact strip can be mounted on a rod of the gearbox when using a change-gear train to position the element.

In an advantageous configuration, the contact element has a first contact and a second contact positioned at a distance from the first contact, where the first and second contacts can be brought into contact to form a current-carrying connection by applying pressure. The use of a contact element of this kind is inexpensive and simple to install in furniture. The use of contact elements of this kind is also advantageous in that they are of simple and durable design.

In a preferred configuration of the invention, a contact strip is provided as the first contact and a wire as the second contact, said wire being positioned parallel to, and at a distance from, a side surface of the contact strip and running in the longitudinal direction of the contact strip. Using a contact strip of this kind makes it particularly simple to establish a current-carrying point connection. For example, if the wire is positioned in the centre at a distance from a side surface of the contact strip, slight pressure can deflect the wire, thus creating a current-carrying connection and closing the electric circuit. For this purpose, the first contact in the form of a contact strip is expediently mounted on the furniture, so that the wire is pressed against the contact strip if there is a danger of something becoming trapped.

The contacts inside the contact strip are expediently sheathed in a plastic material, where the sheath is hollow in the area between the contacts to allow for the current-carrying connection of the contacts. Sheathing the contacts in a plastic material makes it possible to protect them against environmental influences and to protect the user from the electric voltage carried by the contacts. With plastic sheathing, the contact element can be cleaned easily, for example by wiping with a damp cloth. In order to be able to create a current-carrying connection between the contacts, the sheath has a chase in an area in which contact can occur. In the region of the second contact, the sheath encloses the contact in the form of an arc. The wall thickness of the sheath in this region is a factor which contributes to determining the pressure necessary to create a current-carrying connection.

The contact strip preferably covers the perimeter of the gap in which an object or body part can become trapped. Positioning the contact strip on the perimeter of the gap and not inside it reliably rules out the possibility of something becoming trapped.

The contact strip advantageously covers the upper perimeter of the gap in which an object or body part can become trapped. This position of the contact strip is advantageous because when something becomes trapped, an evasive motion is usually made in the upward direction, such as pulling the hand up and out of the gap in an armchair when the user is sitting in the armchair and reaches into the gap from above. By positioning the contact strip on the upper perimeter, the switch which prevents further movement of the element is bridged sooner as a result of the evasive motion. However, protection against trapping is also provided by other contact strip positions.

The positioning drive is expediently equipped with a DC motor and the bridging of the switch by the contact element activates a switching element which reverses the polarity of an electrical connection of the motor. Reversing the polarity of the electrical connections of a DC motor causes it to reverse the direction of motion. Consequently, reversing the polarity of a motor previously driven in one direction brings it to a standstill. If the motor was previously at a standstill, closing the contact element sets the motor in motion.

Preferably, the motor of the positioning drive, the polarity of which has been reversed by activating the switching element, triggers movement of the positioning drive which counteracts trapping in the gap. Since the motor caused something to become trapped in the gap before the polarity was reversed, it first comes to a standstill during reversal of the polarity. If the polarity which triggers the movement of the motor is changed, reversed polarity of the motor causes the motor to run in the opposite direction and trigger a counteractive movement of the positioning drive.

The motor of the positioning drive is preferably connected electrically to a voltage source via two wires, where each of the wires is associated with a switching element with two positions which can be controlled via a control cable and which, depending on the position of the switching element, connects the end of the wire connected to the motor with a different pole of the voltage source and which, during application of a control voltage, changes from a normal position to a second position, where the switching elements are arranged such that no voltage is applied to the motor in the normal position and where the control voltage can be applied to the switching elements by closing the associated switches on the operating controls. In particular, a safety device of this kind combines the advantages of effective control of the positioning drive via switching elements and those of the safety device.

The controllable switching elements with two positions in the two wires result in a total of four different connections between the wire ends connected to the motor and the voltage source. In two positions, namely in the normal position of both switching elements and in the position in which both switching elements are excited, the voltage carried by the wires leading to the motor is the same, so that the motor stands still. In the other two positions, the motor runs forwards or backwards, depending on the selected polarity. If one of the switching elements is moved from the normal position to the second position by applying a control voltage, the associated wire carries a different voltage than the other wire, with which the motor is driven forwards or backwards. If a voltage is applied to the motor which causes something to become trapped in the gap, closing the contact bridges the switch which triggers the opposite movement, and the second switching element is moved out of the normal position. If the first switching element now jumps back to its normal position, the closed contact reverses the polarity of the motor and it runs in the other direction.

Relays can be provided as the switching elements.

An advantageous configuration of the invention is described in further detail below based on the following drawings.

BRIEF DESCRIPTION OF THE DRAWINGS

The drawings show the following:

FIG. 1 A top view of a contact element,

FIG. 2 A cross-section along line II—II in FIG. 1,

DETAILED DESCRIPTION OF THE INVENTION

Figure 3:
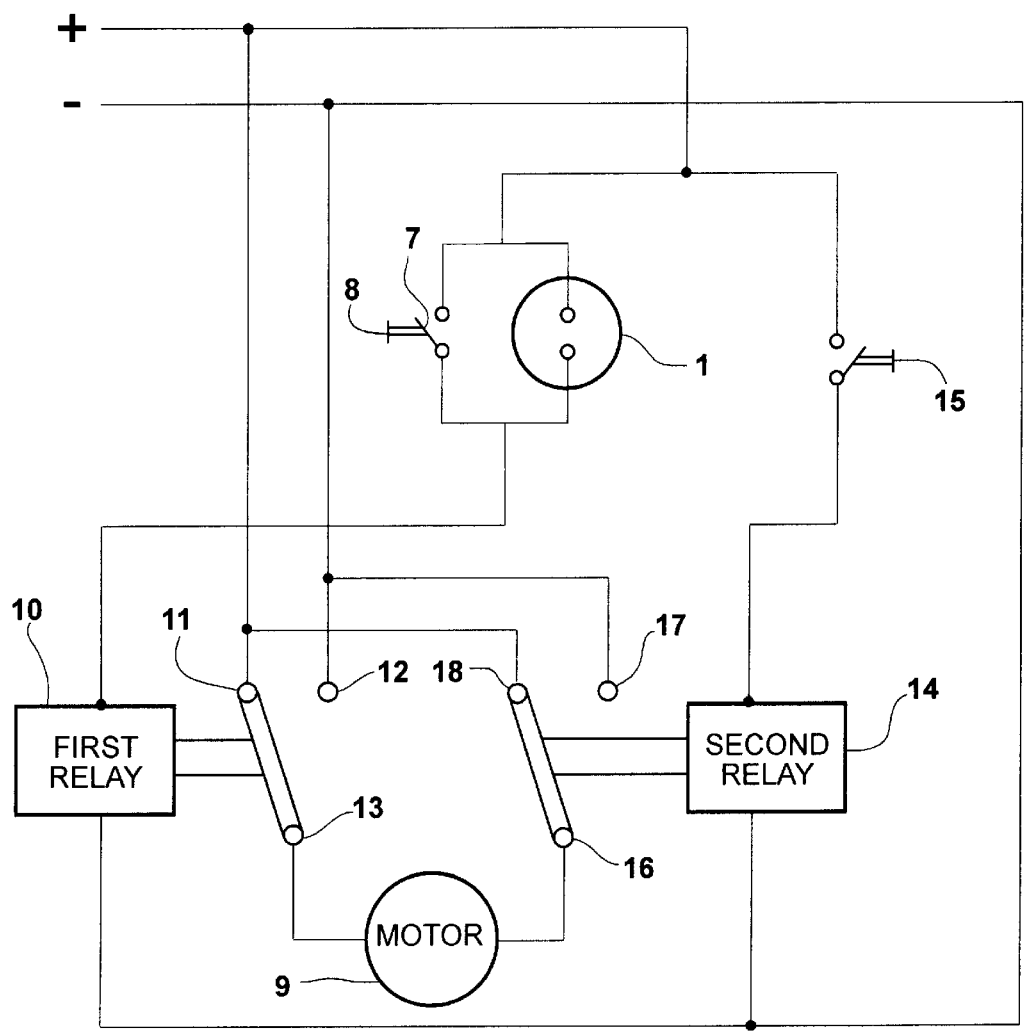
FIG. 3 A circuit diagram of a safety device.

FIG. 1 shows a contact element 1 with two outgoing wires 2 and 3. Contact element 1 is designed in the form of a contact trip. Contact strip 1 consists of a contact 4 of T-shaped design. The foot of the T-shaped contact strip is positioned in the centre of the strip and essentially forms first contact 4. First contact 4 can be made of metal foil or sheet metal, for example.

A second contact 5 is positioned centrally above first contact 4. Second contact 5 is designed in the form of a wire in contact element 1 illustrated. Both contacts 4 and 5 are encased in sheath 6 made, for example, of plastic. A cavity exists between the first and second contacts 4 and 5, which permits a current-carrying connection to be made between contacts 4 and 5 by applying a pressure from the direction indicated by the arrow. The point contact between first and second contacts 4 and 5 connects wires 2 and 3 to one another in conductive fashion.

Contact element 1 is connected in parallel to a switch, as shown in FIG. 3. Closing contact element 1 bridges switch 7. Switch 7 is activated by a button 8 on an operating control (not shown). Pressing button 8 sets motor 9 in motion. As FIG. 3 directly indicates, closing the contact element has the same effect as pressing button 8.

Closing contact element 1 or switch 7 causes a voltage to be applied to relay 10 which breaks contacts 11 and 13 and completes a current-carrying connection between contacts 12 and 13. This reverses the polarity of a connection of motor 9.

As indicated by the position illustrated in FIG. 3, and given the position of second relay 14, exciting relay 10 causes the motor to be supplied with voltage and triggers motion of the positioning drive.

If, for example, button 15 in the circuit arrangement illustrated in FIG. 3 is pressed, contacts 16 and 17 form a current-carrying connection. If only button 15 is pressed, meaning that contacts 11 and 13 form a current-carrying connection, the motor is driven in e direction. If this movement of the motor closes contact element 1, relay 10 is excited and contacts 12 and 13 form a current-carrying connection. This brings motor 9 to a standstill and prevents any further movement of the furniture element. If button 15 is now not further pressed, relay 14 returns to the normal position which connects contacts 16 and 18 to one another, so that, while contact element 1 is closed, the motor now runs in the opposite direction, as long as contact element 1 is closed.

Slatted bed base 19 with head 20, which can be adjusted via a gearbox 21, can have several contact elements 1 positioned in the gap which presents a danger of trapping. As shown in FIG. 4, three contact elements are required in this case in order to reliably rule out the possibility of something becoming trapped.

What is claimed is:

1. Safety device for furniture having at least one movable element which can be moved by a motor-driven positioning drive controlled by operating controls, particularly the head and/or foot of a base for a bed or recliner, or a seat and/or backrest element of an armchair, where the positioning of the element forms a gap in which an object or body part can become trapped as a result of the movement of the element, and with at least one contact element positioned in said gap, characterised in that said at least one contact element, when subjected to the pressure of an object or body part, closes an electric circuit, that the motor of the positioning drive is connected electrically to a voltage source via two wires, where each of the wires is associated with a switching element with two positions which can be controlled via a control cable and which, depending on the position of the switching element, connects the end of the wire connected to the motor with a different pole of the voltage source and which, during application of a control voltage, changes from a normal position to a second position, where the switching elements are arranged such that in the normal position no voltage is applied to the motor and where the control voltage can be applied to the switching elements by closing the associated switches on the operating controls, and that a control voltage can be applied to the switching element by closing the electric circuit by said contact element, whereby said switching element triggers a movement of the positioning drive which counteracts trapping in the gap.

2. Safety device as per claim 1, characterised in that a switch associated with an operating control is bridged when the contact element closes the electric circuit.

3. Safety device as per claim 2, characterised in that the bridging of the switch associated with the operating control by the contact element activates a switching element which reverses the polarity of an electrical connection of the motor.

4. Safety device as per claim 1, characterised in that the switch is a button on a hand-held control unit.

5. Safety device as per claim 1, characterised in that a contact strip is provided as the contact element (1).

6. Safety device as per claim 1, characterised in that relays are provided as the switching elements.

7. Safety device for furniture having at least one movable element which can be moved by a motor-driven positioning drive controlled by operating controls, particularly the head and/or foot of a base for a bed or recliner, or a seat and/or backrest element of an armchair, where the positioning of the element forms a gap in which an object or body part can become trapped as a result of the movement of the element, and with at least one contact element positioned in said gap, characterised in that said at least one contact element, when subjected to the pressure of an object or body part, closes an electric circuit, that the contact element has a first contact and a second contact positioned parallel to, and at a distance from, the first contact, where the first and second contacts can be brought into contact to form a current carrying connection by applying pressure, that the motor of the positioning drive is connected electrically to a voltage source via two wires, where each of the wires is associated with a switching element with two positions which can be controlled via a control cable and which, depending on the position of the switching element, connects the end of the wire connected to the motor with a different pole of the voltage source and which, during application of a control voltage, changes from a normal position to a second position, where the switching elements are arranged such that no voltage is applied to the motor in the normal position and where the control voltage can be applied to the switching elements by closing the associated switches on the operating controls, and that a control voltage can be applied to the switching element by closing the electric circuit by said contact element, whereby said switching element triggers a movement of the positioning drive which counteracts trapping in the gap.

8. Safety device as per claim 7, characterised in that a switch associated with an operating control is bridged when the contact element closes the electric circuit.

9. Safety device as per claim 7, characterised in that the bridging of the switch associated with the operating control by the contact element activates a switching element which reverses the polarity of an electrical connection of the motor.

10. Safety device as per claim 7, characterised in that the switch is a button on a hand-held control unit.

11. Safety device as per claim 7, characterised in that a contact strip is provided as the contact element.

12. Safety device as per claim 7, characterised in that a contact strip is provided as the first contact and a wire as the second contact, said wire being positioned parallel to, and at a distance from, a side surface of the contact strip and running in the longitudinal direction of the contact strip.

13. Safety device as per claim 7, characterised in that the contacts inside the contact strip are sheathed in a plastic material, where the sheath is hollow in the area between the contacts to allow for the current carrying connection of the contacts.

14. Safety device as per claim 7, characterised in that the contact strip covers the perimeter of the gap in which an object or body part can become trapped.

15. Safety device as per claim 14, characterised in that the contact strip covers the upper perimeter of the gap in which an object or body part can become trapped.

16. Safety device as per claim 7, characterised in that relays are provided as the switching elements.

* * * * *